(12) United States Patent
Toller et al.

(10) Patent No.: US 8,785,814 B1
(45) Date of Patent: Jul. 22, 2014

(54) OPTIC PROTECTION VIA STAGNANT LIQUID FILM

(75) Inventors: Steven M. Toller, Dublin, OH (US); Ronald L. Johnson, Hilliard, OH (US)

(73) Assignee: LSP Technologies, Inc., Dublin, OH (US)

( * ) Notice: Subject to any disclaimer, the term of this patent is extended or adjusted under 35 U.S.C. 154(b) by 531 days.

(21) Appl. No.: 12/435,872

(22) Filed: May 5, 2009

(51) Int. Cl.
*B23K 26/00* (2014.01)

(52) U.S. Cl.
USPC .................................. 219/121.72; 219/121.84

(58) Field of Classification Search
USPC ............... 219/121.85, 121.6, 121.84, 121.72; 218/121.84; 73/588
See application file for complete search history.

(56) References Cited

U.S. PATENT DOCUMENTS

| | | | |
|---|---|---|---|
| 3,850,698 A * | 11/1974 | Mallozzi et al. ............... | 148/515 |
| 4,401,477 A * | 8/1983 | Clauer et al. .................. | 148/525 |
| 4,937,421 A * | 6/1990 | Ortiz et al. .............. | 219/121.68 |
| 5,127,019 A * | 6/1992 | Epstein et al. ................ | 372/108 |
| 5,131,957 A * | 7/1992 | Epstein et al. ................ | 148/565 |
| 5,741,559 A | 4/1998 | Dulaney | |
| 5,911,891 A | 6/1999 | Dulaney et al. | |
| 6,049,058 A * | 4/2000 | Dulaney et al. .......... | 219/121.84 |
| 6,064,035 A * | 5/2000 | Toller et al. ............... | 219/121.86 |
| 6,127,649 A * | 10/2000 | Toller et al. ............... | 219/121.86 |
| 6,288,358 B1 * | 9/2001 | Dulaney et al. ............ | 219/121.6 |
| 6,412,331 B1 | 7/2002 | Clauer et al. | |
| 6,512,584 B1 * | 1/2003 | O'Loughlin et al. ......... | 356/388 |
| 6,720,522 B2 * | 4/2004 | Ikegami et al. .......... | 219/121.69 |
| 6,759,626 B2 * | 7/2004 | Clauer et al. ............... | 219/121.6 |
| 6,818,854 B2 * | 11/2004 | Friedman et al. .......... | 219/121.6 |
| 6,848,321 B2 * | 2/2005 | Bossi et al. ..................... | 73/842 |
| 6,923,877 B1 * | 8/2005 | Anderson ..................... | 148/525 |
| 7,509,876 B1 | 3/2009 | Sokol et al. | |
| 7,770,454 B2 * | 8/2010 | Sokol et al. ..................... | 73/588 |
| 7,775,122 B1 | 8/2010 | Toller et al. | |
| 8,132,460 B1 | 3/2012 | Toller et al. | |
| 8,156,811 B2 | 4/2012 | Toller et al. | |
| 8,225,664 B1 | 7/2012 | Sokol et al. | |
| 2002/0017514 A1 * | 2/2002 | Lambert .................. | 219/121.84 |
| 2005/0062388 A1 * | 3/2005 | Camm et al. ............. | 313/231.71 |
| 2006/0012770 A1 * | 1/2006 | Dierichs ........................ | 355/71 |
| 2008/0105666 A1 * | 5/2008 | Adachi et al. ............ | 219/121.82 |

\* cited by examiner

*Primary Examiner* — Sang Y Paik

(74) *Attorney, Agent, or Firm* — Benesch, Friedlander, Coplan & Aronoff LLP

(57) ABSTRACT

Systems and methods for the protection of optics are provided. In one example embodiment, a laser processing system is provided, the laser processing system comprising a laser source and an optic. The laser processing system may further comprise at least one of a liquid delivery mechanism configured to deposit liquid on the optic and an evacuation mechanism.

16 Claims, 5 Drawing Sheets

OPTIC PROTECTION VIA STAGNANT LIQUID FILM

BACKGROUND

Laser processing has many applications. One application is laser shock processing. Laser shock processing (also known as the Laser Peen® process, laser shock peening, or laser peening) is an innovative surface treatment for improving the fatigue strength and damage tolerance of various workpieces, typically including metal parts. Laser shock processing drives high amplitude shock waves, generated by high intensity laser pulses, into a material surface. The shock waves are used to develop deep compressive residual stresses in the surfaces of fatigue-prone parts. Typically, these compressive residual stresses penetrate five to ten times deeper than conventional metal shot peening. These compressive residual stresses inhibit the initiation and propagation of fatigue cracks.

Another application includes laser bond inspection (LBI). LBI may be used for non-destructive inspection of structures assembled with adhesive bonds. LBI typically involves depositing laser energy onto the front surface of a bonded article, thereby generating compression waves that reflect off of the back surface of the bonded article as tensile waves. The tensile waves provide stresses that interrogate the bond.

Another application includes laser induced bond delamination, which generally comprises laser processing a bonded structure to intentionally induce defects in one or more bonds contained in the bonded structure.

In each of these applications, before processing, an overlay coating, which may be substantially opaque to the laser beam, may be applied to the material surface being processed. An additional layer, which may be substantially transparent to the laser beam, may be applied over the opaque overlay or directly onto the material surface (i.e., no opaque overlay coating is applied). The opaque overlay may include, without limitation, tape, paint, or a liquid erosion-resistant coating as described in U.S. Pat. No. 7,268,317, which is incorporated herein by reference in its entirety. The transparent overlay may include, but is not limited to, water, water-based solutions, other noncorrosive liquids, glass, quartz, sodium silicate, fused silica, potassium chloride, sodium chloride, polyethylene, fluoroplastics, nitrocellulose, and mixtures thereof.

The laser pulses pass through the transparent overlay and strike the opaque overlay, causing it to vaporize. The vapor absorbs the remaining laser energy and produces a rapidly expanding plasma plume. Since the expanding plasma is confined momentarily between the surface of the part and the transparent overlay, a rapidly rising high-pressure shock wave is created, which propagates into the material.

These shock wave-generation processes often produce debris and vapor from target surfaces, contaminating nearby optics and sensors of the laser processing equipment. In some instances, these contaminants form a cloud that interferes with sensors and/or subsequent laser pulses. These contaminants may also damage the optics.

SUMMARY

In one embodiment, a method for protecting laser optics is provided, the method comprising positioning a laser processing system near a target surface, the laser processing system including an optic; applying a liquid to the optic; allowing the liquid to stagnate; and transmitting laser energy through the optic and the liquid and onto the target surface.

In another embodiment, a method for laser processing is provided, the method comprising: positioning a laser processing system near a target surface, the laser processing system comprising at least one vent and at least one evacuation mechanism; transmitting laser energy onto the target surface; activating the at least one evacuation mechanism; and evacuating an airborne contaminant.

In another embodiment, a laser processing system is provided, the system comprising a laser source and an optic. The laser processing system further comprises at least one of a liquid delivery mechanism configured to deposit liquid on the optic and an evacuation mechanism.

In another embodiment, a system is provided. The operation of the system results in the creation of at least one of debris and vapor. The system comprises: an optic; a sensor operatively connected through the optic to a surface via an optical pathway; and a liquid delivery mechanism configured to deposit liquid on the optic, wherein the liquid at least one of: (1) protects the optic from the at least one of debris and vapor created by the operation of the system; and (2) at least partially clears the optical pathway of the at least one of debris and vapor created by the operation of the system.

BRIEF DESCRIPTION OF THE DRAWINGS

The accompanying figures, which are incorporated in and constitute a part of the specification, illustrate various example apparatuses, systems, methods, and so on, and are used merely to illustrate various example embodiments. It should be noted that various components depicted in the figures may not be drawn to scale, and that the various assemblies and designs depicted in the figures are presented for purposes of illustration only, and should not be considered in any way as limiting.

DETAILED DESCRIPTION

Figure 1:
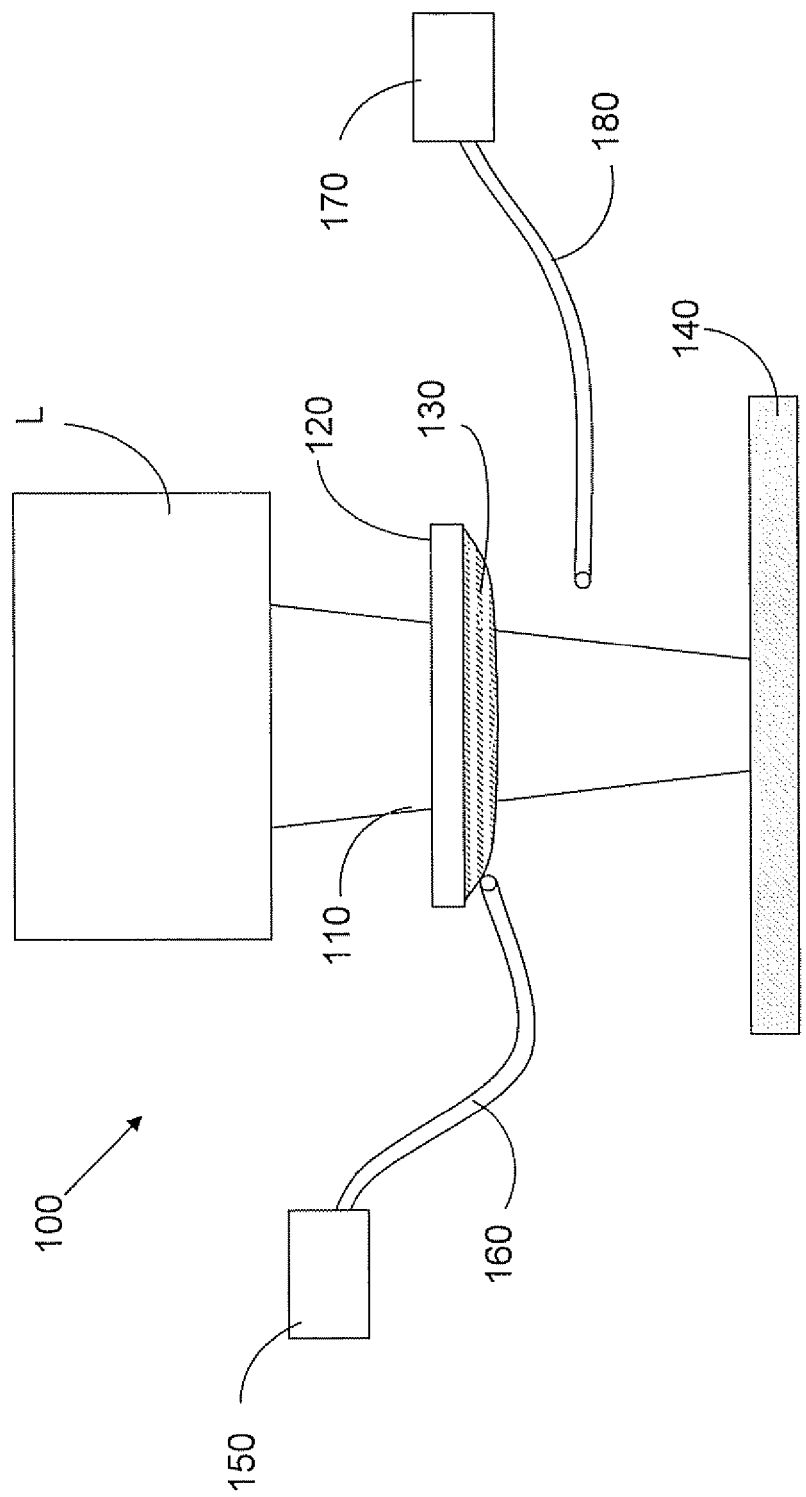
FIG. 1 illustrates one embodiment of a laser processor employing a liquid delivery mechanism.

FIG. 1 illustrates one embodiment of a laser processing system 100 employing a laser source L. The laser source L transmits laser energy 110 through an optic 120 and a liquid layer 130 to a workpiece target surface 140. Target surface 140 may also include an opaque overlay and a transparent overlay. Example laser sources L for laser shock processing are described in, for example, U.S. Pat. Nos. 5,741,559, 5,911,891, 6,412,331, 5,131,957, and 5,127,019, all of which are incorporated herein by reference in their entireties. Example laser sources L for LBI are described in, for example, U.S. patent application Ser. Nos. 10/950,865, 11/227,745, 11/873,677, 11/873,705, and 11/873,571, all of which are incorporated herein by reference in their entireties. Example laser sources L for laser induced bond delamination are described in U.S. patent application Ser. No. 12/435,448, which is incorporated herein by reference in its entirety.

The optic 120 may be a lens or a window constructed of glass or a polymeric material. In one embodiment, the optic 120 is spaced from the target surface 140 by a distance of about 0.5 inch to about 7 inches. In another embodiment, the optic 120 is spaced from the target surface 140 by a distance of greater than 7 inches. In another embodiment, the optic 120 is spaced from the target surface 140 by a distance of less than 0.5 inch.

The liquid layer 130 may be water or any other liquid that is not harmful to the optic and that is substantially transparent to the laser beam. In the illustrated embodiment, the liquid layer 130 is applied to a surface of the optic 120 by a liquid delivery mechanism 150 through a liquid applicator tube 160. The liquid delivery mechanism 150 may be any device capable of applying a liquid, for example, a pump. The liquid applicator tube 160 may be a rigid tube or a flexible tube. The liquid applicator tube 160 may be constructed of metal, glass, or a polymeric material. The liquid applicator tube 160 (and any "applicator tube" described in the present embodiments) may alternatively be any type of apparatus known in the art that is capable of transferring or allowing the flow of liquid from the liquid delivery mechanism to the surface of the optic (e.g., a machined channel).

In one embodiment, the liquid delivery mechanism 150 applies liquid to the optic 120 for a period of time (the application period), and then stops applying liquid for a period of time (the stop period).

It should be understood that during the application period, liquid flows across the surface. The flow may be turbulent or laminar. During the stop period, the liquid will continue to flow for a period, until it becomes stagnant. At this time, surface tension will cause the liquid to form a substantially flat sheet over the surface of the optic 120. In this form, water and other liquids have minimal optical refractive effects on laser energy 110. If the liquid remains stagnant too long, however, surface tension may pull the sheet edges towards the center of the optic. In one known embodiment, the stop time lasts from about two seconds to about eight seconds. However, shorter and longer stop times are equally contemplated.

It should be further understood that the term "stagnant" as used herein means that the liquid is not moving or flowing, that is, it is essentially motionless; or that the liquid is flowing such that the flowing liquid's surface is substantially flat, with no significant surface turbulence (e.g., ripples). In other words, the term "stagnant" describes the substantial absence of surface distortions in the liquid at the time laser energy is transmitted through the optic and the liquid. In the same way, to allow liquid to "stagnate" means to allow the liquid to stop moving or flowing; or to provide a liquid flow such that the flowing liquid's surface is substantially flat, with no significant surface turbulence.

Thus, in one embodiment, laser energy 110 is emitted from the laser source L during the stop period, when the liquid is stagnant. In this phase, the laser energy passes through liquid layer 130 and optic 120. If the liquid is flowing in such a way as to cause significant surface turbulence during the laser shot, refractive distortions of the transmitted beam may occur, resulting in random scattering of the energy on the target.

With continued reference to FIG. 1, the laser processing system 100 further includes at least one evacuation mechanism 170. The evacuation mechanism 170 includes an evacuation tube 180 having an end disposed between the optic 120 and the target surface 140. The evacuation mechanism 170 may be activated after the deposition of laser energy 110 onto the target surface 140 to remove either the liquid layer 130, any airborne contaminant formed from the deposition of laser energy, or both, through evacuation tube 180. The evacuation mechanism 170 may be any device capable of collecting and removing a liquid, a gas, or both. For example, the evacuation mechanism 170 may be a vacuum pump.

As depicted in FIG. 1, the stagnant liquid layer 130 may function to protect the surface of the optic 120 from any airborne contaminants or flying debris originating from the target surface 140. These airborne contaminants and flying debris are intercepted and suspended in the liquid layer 130. In one embodiment, the liquid layer 130 is at least one of: (1) evacuated by the at least one evacuation mechanism 170; (2) washed away by the next application of liquid by the liquid delivery mechanism 150; and (3) removed by a short blast of gas. Any contaminants suspended in the liquid layer 130 will be removed before or during the next application of liquid.

Figure 2:
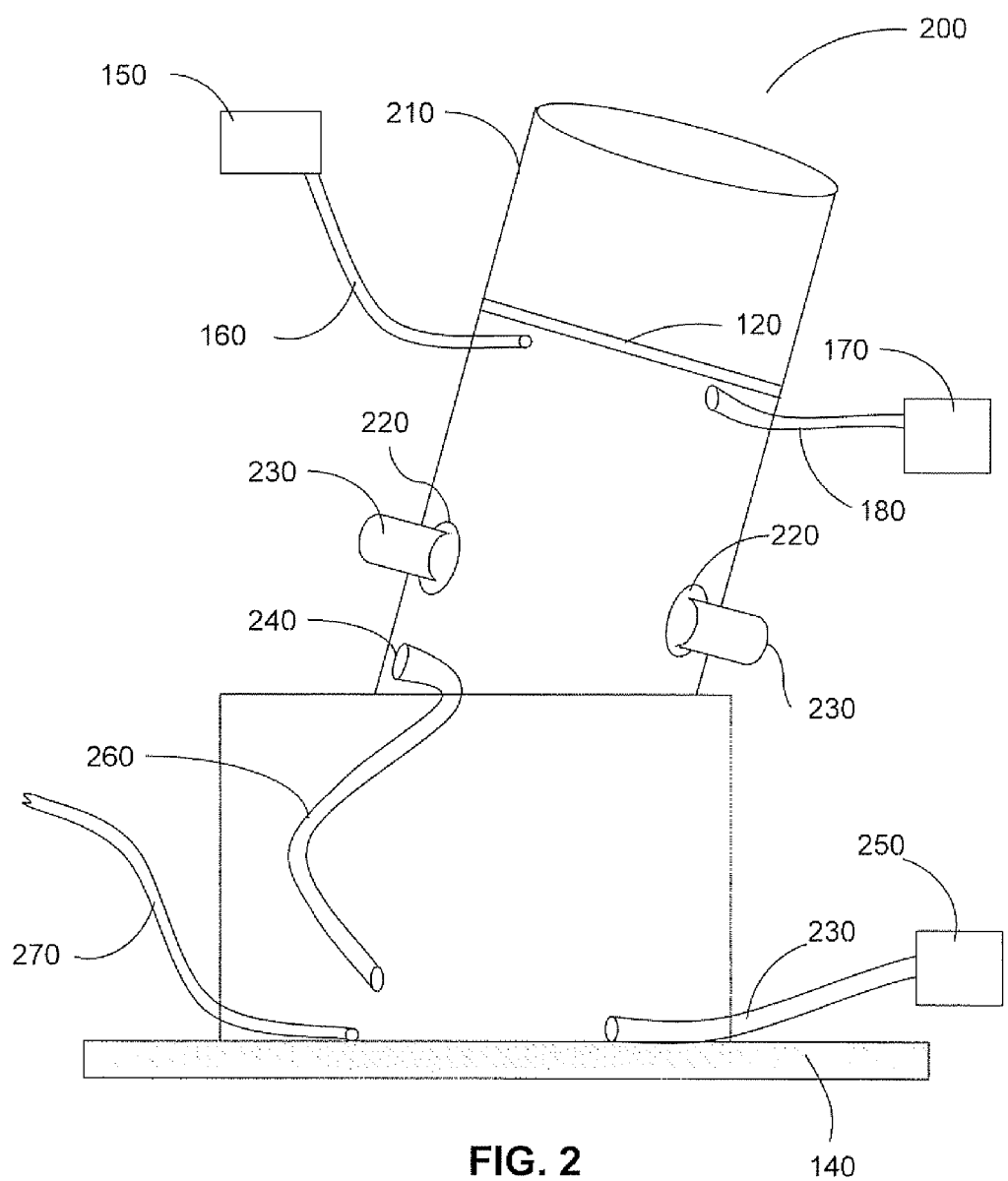
FIG. 2 illustrates an alternative embodiment of a laser processor employing a liquid delivery mechanism.

FIG. 2 illustrates an alternative laser processing system 200 having a housing 210. The laser processing system 200 includes an optic 120, a liquid delivery mechanism 150 having a liquid applicator tube 160, and an evacuation mechanism 170 with an evacuation tube 180.

The laser processing system 200 further includes a second evacuation mechanism 250 with a second evacuation tube 230 to expedite evacuation of gases and contaminants. In the illustrated embodiment, the first evacuation mechanism 170 and associated evacuation tube 180 are disposed adjacent the optic 120, while the second evacuation mechanism 250 and associated second evacuation tube 230 are disposed adjacent the target surface 140. However, it should be understood that any number of evacuation mechanisms may be employed and placed at any location.

In the illustrated embodiment, the laser processing system 200 further includes several vents 220, 240 in the housing 210. While three vents 220, 240 are shown in FIG. 2, it should be understood that any number of vents may be employed. The vents 220, 240 allow for the flow of a gas from the interior to the exterior of the housing 210 to prevent pressure buildup. In the illustrated embodiment, optional sound muffling devices 230 are associated with vents 220 to dissipate the noise created during the deposition of laser energy onto the target surface 140.

The vents 220, 240 may also permit gas to flow from the exterior of the housing 210 to the interior. The evacuation mechanisms 170, 250 may remove airborne contaminants from the interior of the laser processor head, while drawing uncontaminated gas from the exterior to replace the contaminated gas. The laser processing system 200 may include at least one vent 240 located near the midpoint of the distance between the optic 120 and the target surface 140 to create a two-directional flow of airborne contaminants to the evacuation tubes 180, 230. In alternative embodiments, the vents 220, 240 may be placed at any location on the housing 210.

In the illustrated embodiment, vent 240 includes a target surface vent tube 260 having an opening disposed adjacent the target surface 140. It should be understood that two or more vents may employ target surface vent tubes. During operation of the evacuation mechanisms 170, 250, the target surface vent tube 260 permits a flow of gas from the exterior of the housing 210 to the target surface 140. Directing this flow of gas to the target surface 140 assists in the evacuation of airborne contaminants originating from the target surface immediately following the deposition of laser energy onto the target surface.

With continued reference to FIG. 2, the laser processing system 200 may further include a transparent overlay application tube 270.

Figure 3:
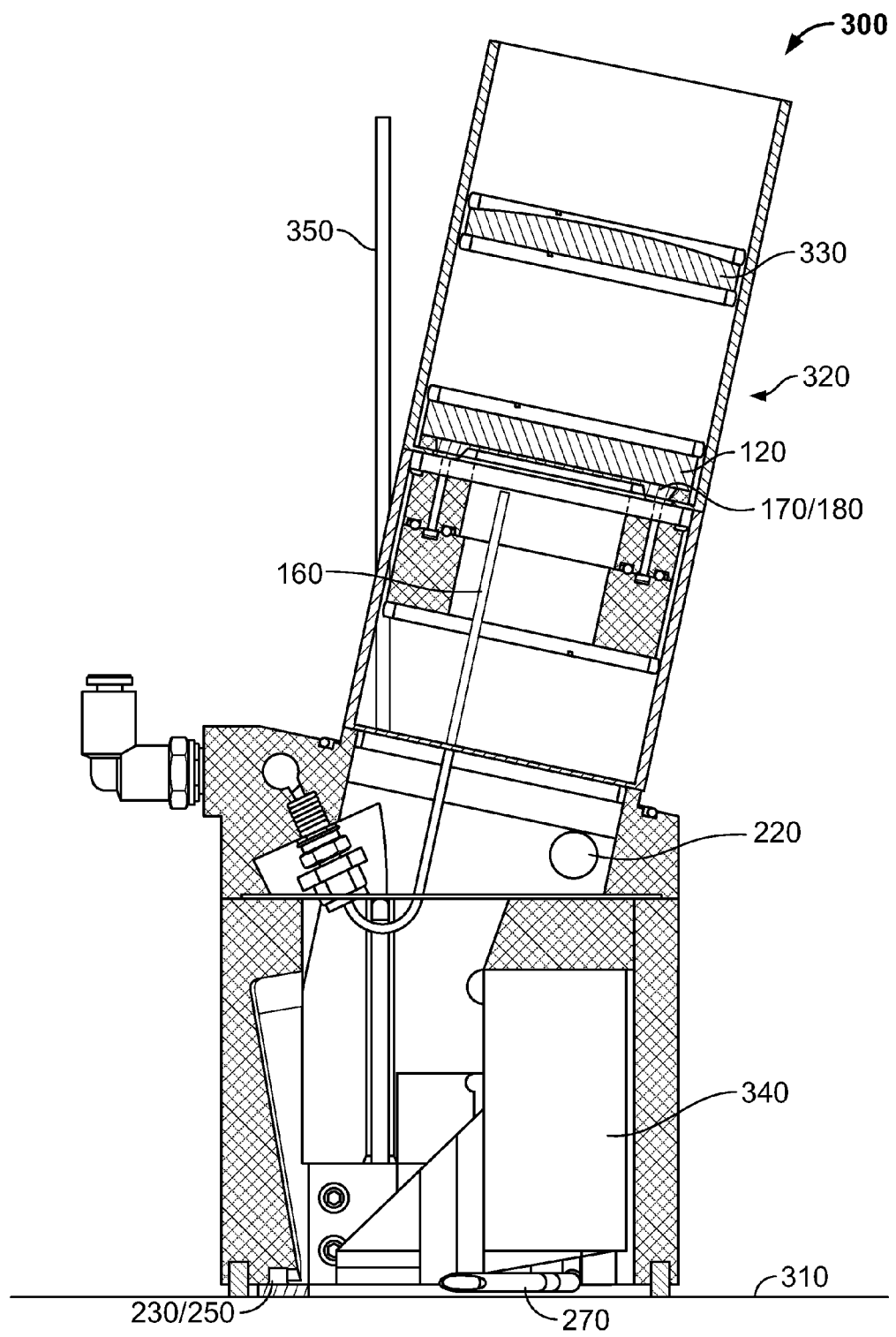
FIG. 3 illustrates an example embodiment of a laser processing head.

FIG. 3 is a schematic diagrammatic view of one embodiment of a laser processing head 300 that facilitates delivery of a laser beam from an articulated arm to an adhesively bonded structure surface 310. The illustrated laser processing head 300 includes a housing 320. A lens 330 is disposed within housing 320. Further, at least one magnet 340 is disposed within housing 320, and at least one sensor 350 is at least partially disposed within housing 320.

Figure 4:
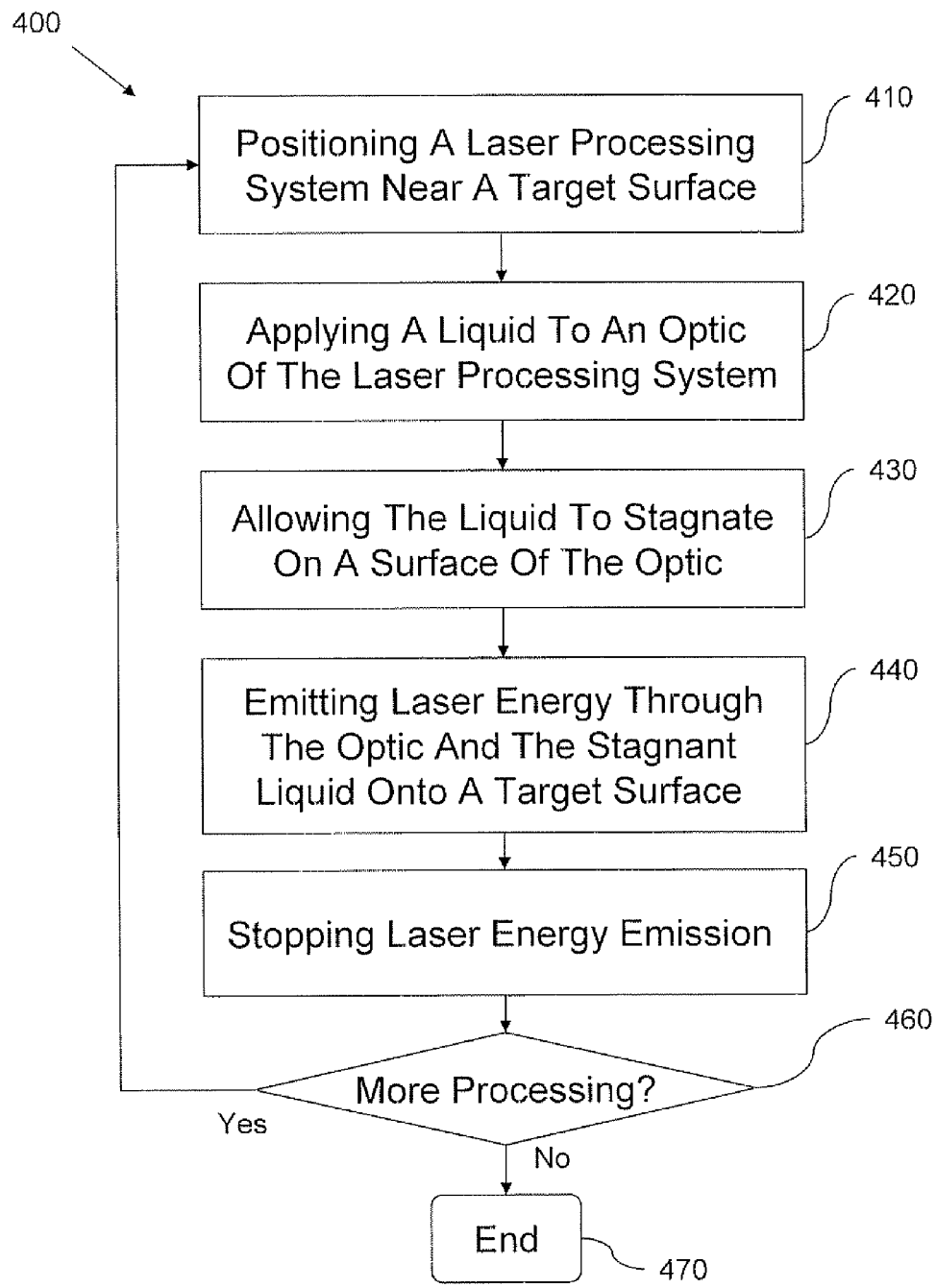
FIG. 4 illustrates a flowchart depicting one embodiment of a method for protecting laser optics.
Figure 5:
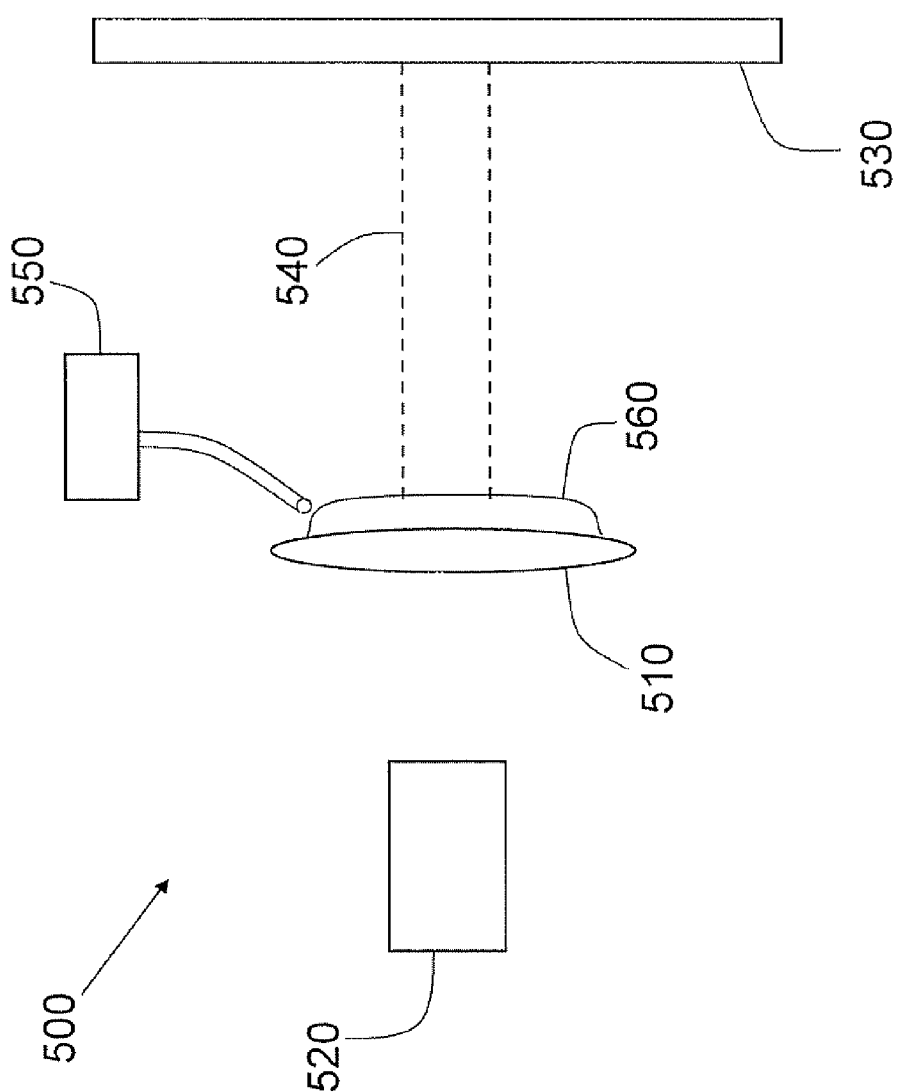
FIG. 5 illustrates an example embodiment of a system fore protecting an optic and/or clearing a sensor's optical pathway.

FIG. 4 illustrates a flowchart depicting one embodiment of a method 400 for protecting laser optics in a laser processing system. The laser processing system may include an optic, a liquid delivery mechanism, and an evacuation mechanism. The laser processing system may also optionally include one or more vents. The vents may have associated muffling devices or vent tubes. Example laser processing systems that may be used in the method 400 are illustrated in FIGS. 1, 2, and 3.

The method 400 includes positioning the laser processing system "near" a target surface (410) and applying a liquid to the optic (420). Of course, one of ordinary skill in the art will readily recognize that the proximity and/or orientation of the laser source relative to the workpiece target surface may vary, and may be any operable or workable range and/or displacement. After the liquid is applied to the optic, it is allowed to stagnate on a surface of the optic (430). Laser energy is then transmitted through the optic and the stagnant liquid, onto the target surface (440), which, as noted above, may include a transparent overlay and an opaque overlay. The laser energy emission is then stopped (450). If more laser processing is required (460), the steps of applying a liquid (420), allowing the liquid to stagnate (430), emitting/transmitting laser energy (440), and stopping laser energy emission/transmission (450) are repeated. If no more laser processing is required, the process terminates (470).

In an alternative embodiment, the method further comprises evacuating the liquid following the deposition of laser energy onto the target surface. The liquid may be evacuated by activating at least one evacuation mechanism.

In another alternative embodiment, the method further comprises at least one of: (1) providing a substantially transparent overlay over the target surface; and (2) applying a substantially opaque overlay over the target surface and providing a substantially transparent overlay over the opaque overlay.

In yet another alternative embodiment, the method further comprises evacuating an airborne contaminant from the interior of the laser processor head. In one such embodiment, the airborne contaminant is evacuated by activating at least one evacuation mechanism to evacuate the airborne contaminant from at least a part of the interior of a housing of the laser processing system.

In still another embodiment, the method includes venting gas from the interior to the exterior of a housing of the laser processing system. Such an embodiment may also include venting gas from the exterior to the interior of a housing of the laser processing system. The gas may be air or any other gas or combination of gases as those skilled in the art might employ.

The systems, methods, and so on have been described in the context of laser processing applications. However, such descriptions are only for illustrative purposes and should not be viewed as limiting in any way. Indeed, in one embodiment, a system 500 is provided. The operation of system 500 results in the creation of at least one of debris and vapor. Thus, system 500 comprises: an optic 510; a sensor 520 operatively connected through optic 510 to a surface 530 via an optical pathway 540; and a liquid delivery mechanism 550 configured to deposit liquid 560 on optic 510, wherein liquid 560 at least one of: (1) protects optic 510 from the at least one of debris and vapor created by the operation of system 500; and (2) at least partially clears optical pathway 540 of the at least one of debris and vapor created by the operation of system 500. System 500 may further comprise a vacuum evacuation mechanism as described above.

As used herein, the term "operatively connected" means related in such a way as to perform a designated function. In one embodiment, the sensor may be operatively connected to the surface as understood with respect to laser shock processing, laser bond inspection, or laser induced bond delamination. In another embodiment, the sensor may be operatively connected to the surface in a manner unassociated with a laser or laser processing application.

While the systems, methods, and so on have been illustrated by describing examples, and while the examples have been described in considerable detail, it is not the intention of the applicant to restrict, or in any way, limit the scope of the appended claims to such detail. It is, of course, not possible to describe every conceivable combination of components or methodologies for purposes of describing the systems, methods, and so on provided herein. Additional advantages and modifications will readily appear to those skilled in the art. Therefore, the invention, in its broader aspects, is not limited to the specific details and illustrative examples shown and described. Accordingly, departures may be made from such details without departing from the spirit or scope of the applicant's general inventive concept. Thus, this application is intended to embrace alterations, modifications, and variations that fall within the scope of the appended claims. The preceding description is not meant to limit the scope of the invention. Rather, the scope of the invention is to be determined by the appended claims and their equivalents.

To the extent that the term "includes" or "including" or "having" is employed in the detailed description or the claims, it is intended to be inclusive in a manner similar to the term "comprising," as that term is interpreted when employed as a transitional word in a claim. Furthermore, to the extent that the term "or" is employed in the claims (e.g., A or B) it is intended to mean "A or B or both." When the applicants intend to indicate "only A or B, but not both," then the term "only A or B but not both" will be employed. Similarly, when the applicants intend to indicate "one and only one" of A, B, or C, the applicants will employ the phrase "one and only one." Thus, use of the term "or" herein is the inclusive, and not the exclusive use. See Bryan A. Garner, A Dictionary of Modern Legal Usage 624 (2d. Ed. 1995).

What is claimed is:

1. A method for protecting laser optics, comprising:
providing a laser processing system for delivering a pulse of laser energy to a target surface, the laser processing system including an optic to be protected;
applying a flow of liquid to a surface of the optic, via a liquid delivery mechanism;
allowing the liquid to stagnate upon the surface of the optic such that the liquid is not flowing a period of from about two seconds to about eight seconds;
transmitting the pulse of laser energy through the optic and the stagnant liquid and onto the target surface; and
evacuating the liquid from the surface of the optic.

2. The method of claim 1, wherein the applying a flow of liquid to a surface of the optic comprises applying a flow of liquid to a surface of the optic proximate to the target surface.

3. The method of claim 1, wherein the applying a flow of liquid comprises applying a flow of water.

4. The method of claim 1, wherein the evacuating the liquid from the surface of the optic comprises at least one of: (1) activating at least one evacuation mechanism; (2) washing away the liquid with a subsequent application of liquid; and (3) removing the liquid by a blast of gas.

5. The method of claim 1, further comprising at least one of: (1) providing a substantially transparent overlay over the target surface; or (2) applying a substantially opaque overlay over the target surface and providing a substantially transparent overlay over the opaque overlay.

6. The method of claim 5, wherein the applying a substantially opaque overlay comprises applying black paint or black tape.

7. The method of claim 5, wherein the providing a substantially transparent overlay comprising providing at least one of: (1) a flowing fluid; and (2) a stagnant fluid.

8. The method of claim 1, further comprising evacuating an airborne contaminant from an interior of a housing of the laser processing system.

9. The method of claim 8, wherein the evacuating an airborne contaminant comprises activating at least one evacuation mechanism.

10. The method of claim 1, wherein the optic is at least one of a lens and a window.

11. The method of claim 1, wherein the optic is comprised of at least one of glass and a polymeric material.

12. The method of claim 1, wherein the optic is spaced apart from the target surface by a distance of about 0.5 inch to about 7 inches.

13. The method of claim 1, wherein the liquid is substantially transparent to the pulse of laser energy.

14. The method of claim 1, wherein the laser processing system comprises a laser bond inspection system.

15. The method of claim 1, wherein the target surface is a surface of a bonded article.

16. A method for protecting laser optics, comprising:
providing a laser processing system for delivering a pulse of laser energy to a target surface, the laser processing system including an optic that is spaced apart from the target surface by a distance of from about 0.5 inch to about 7 inches;
applying a flow of liquid to a surface of the optic which is proximate the target surface;
allowing the liquid to stagnate upon the surface of the optic such that the liquid is not flowing for a period of from about two seconds to about eight seconds;
transmitting the pulse of laser energy through the optic and the stagnant liquid and onto the target surface; and
evacuating the liquid from the surface of the optic.

* * * * *